Fig. 2.

J. F. OHMER.
FARE REGISTER.
APPLICATION FILED AUG. 6, 1907.

911,518.

Patented Feb. 2, 1909.
5 SHEETS—SHEET 3.

Fig. 3.

J. F. OHMER.
FARE REGISTER.
APPLICATION FILED AUG. 6, 1907.

911,518.

Patented Feb. 2, 1909.
5 SHEETS—SHEET 5.

Witnesses
Matthew Seibler
C. M. Theobald

Inventor
Jno. F. Ohmer

By R. J. McCarty
Attorney

UNITED STATES PATENT OFFICE.

JOHN F. OHMER, OF DAYTON, OHIO, ASSIGNOR TO OHMER FARE REGISTER COMPANY, OF ROCHESTER, NEW YORK.

FARE-REGISTER.

No. 911,518.      Specification of Letters Patent.      Patented Feb. 2, 1909.

Application filed August 6, 1907. Serial No. 387,290.

REISSUED

*To all whom it may concern:*

Be it known that I, JOHN F. OHMER, a citizen of the United States, residing at Dayton, in the county of Montgomery and State of Ohio, have invented certain new and useful Improvements in Fare-Registers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
This invention relates to improvements in fare registers for use upon street cars for recording fare collections.

The invention relates to a machine that is adapted to be operated from different parts of a car to indicate simultaneously through sight openings in the register and at other points, the amount or fare collected, and to simultaneously make a record of such amount or fare collected and registered, and to include with the record of the fare or the amount collected, a record showing the day, and month, the conductor's identification number or mark, the number of the register, etc., and means for obtaining a printed record or impression of each operation of the machine in registering fares.

The invention consists in combining with other mechanism means whereby the indications on the fare-indicating wheels are concealed from view upon each operation of setting said wheels to indicating positions, and the fares are exposed to view on said wheels in the operations of registering said fares after they have been set, and means for actuating the printing mechanism from the mechanism through which the consecutive printing counter and the passenger indicator counters are operated.

Preceding a more detailed description of my invention, reference is made to the accompanying drawings, of which—

In a detail description of the invention, similar reference characters indicate corresponding parts.

The inclosing frame is of suitable dimensions to house the various mechanisms and consists of parts 1—2—3—4 and 5 indicating the respective sides, top and bottom, the bottom being hinged to the rear side of the casing and held in place by a suitable lock 5$^a$. Supported upon the rear wall of the casing are two brackets 6 in which are journaled telescopic shafts 10—11 and 12, shaft 12 being the inner shaft of the series.

Figures 1, 10, 11, 14:
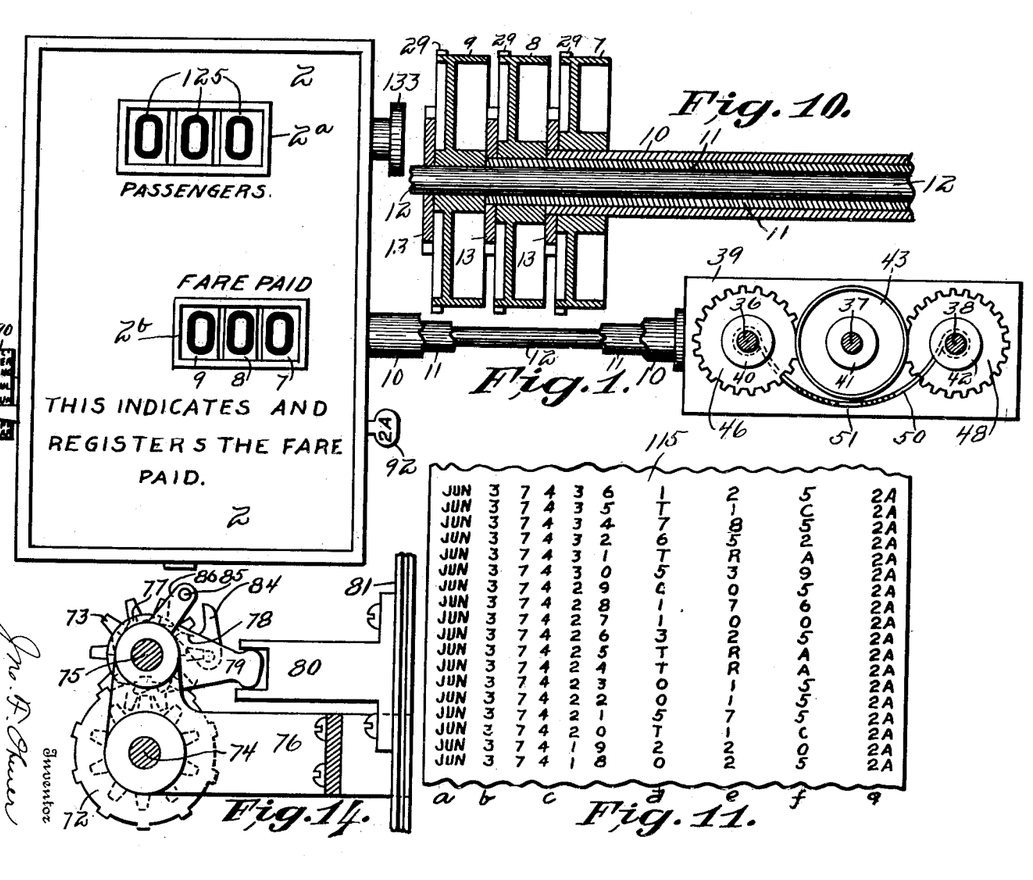
Figure 1, is a front elevation of my invention, showing the machine connected to the setting mechanism, through which the fares are selected for registration.
Fig. 10, is a sectional view of the fare-indicator wheels and their telescopic shafts.
Fig. 11, is a view of the printed statement taken from the machine in the operation of registering a fare.
Fig. 14, is a detail elevation of the printing counter operating mechanism.

As shown in Fig. 10, wheels 7—8 and 9 are mounted upon the ends of said shafts; these wheels being combination-indicating and printing wheels, said wheels being arranged in the series of units, tens and hundreds. It will be seen in Figs. 1 and 2, that these wheels have upon their peripheries numerals from 1 to 9 and 0 which indicate the fare collections and are viewed or visible through the sight opening 2$^b$— Fig. 3. Also on the peripheries of these wheels there are a series of letters which are readable together, that is to say, there is one letter on each wheel which is readable with a letter on the adjacent wheel when these letters are brought into alinement, for example, as shown in dotted lines in Fig. 2, the abbreviated word "Tic" is indicated on the three wheels, the letters being arranged to be readable when brought in alinement. There are also three other letters on the wheels readable in the same manner to indicate a transfer collection, for example, "Tra." It will be understood that each of these wheels has two spaces not occupied by numerals, and it is in these cases that the letters are placed to indicate tickets and transfers, the numerals serving to indicate cash fare collections.

Figure 3:
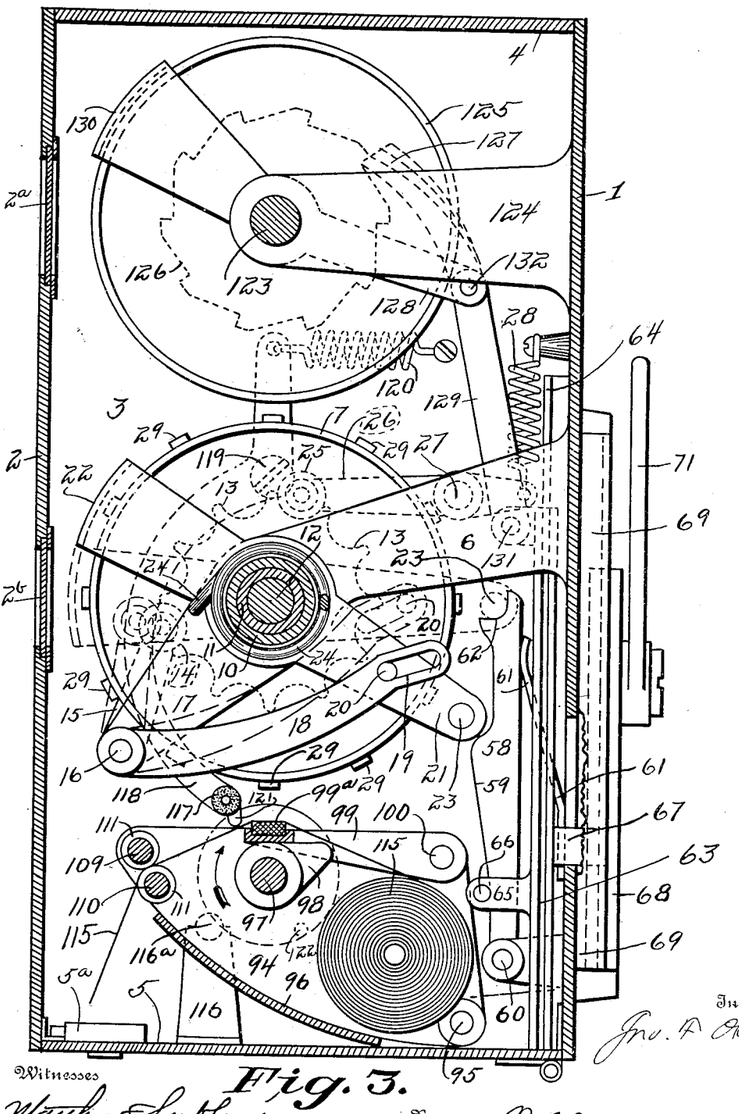
Fig. 3, is a section on the line *a-a* of Fig. 2.
Figures 4, 5, 6, 7, 12:
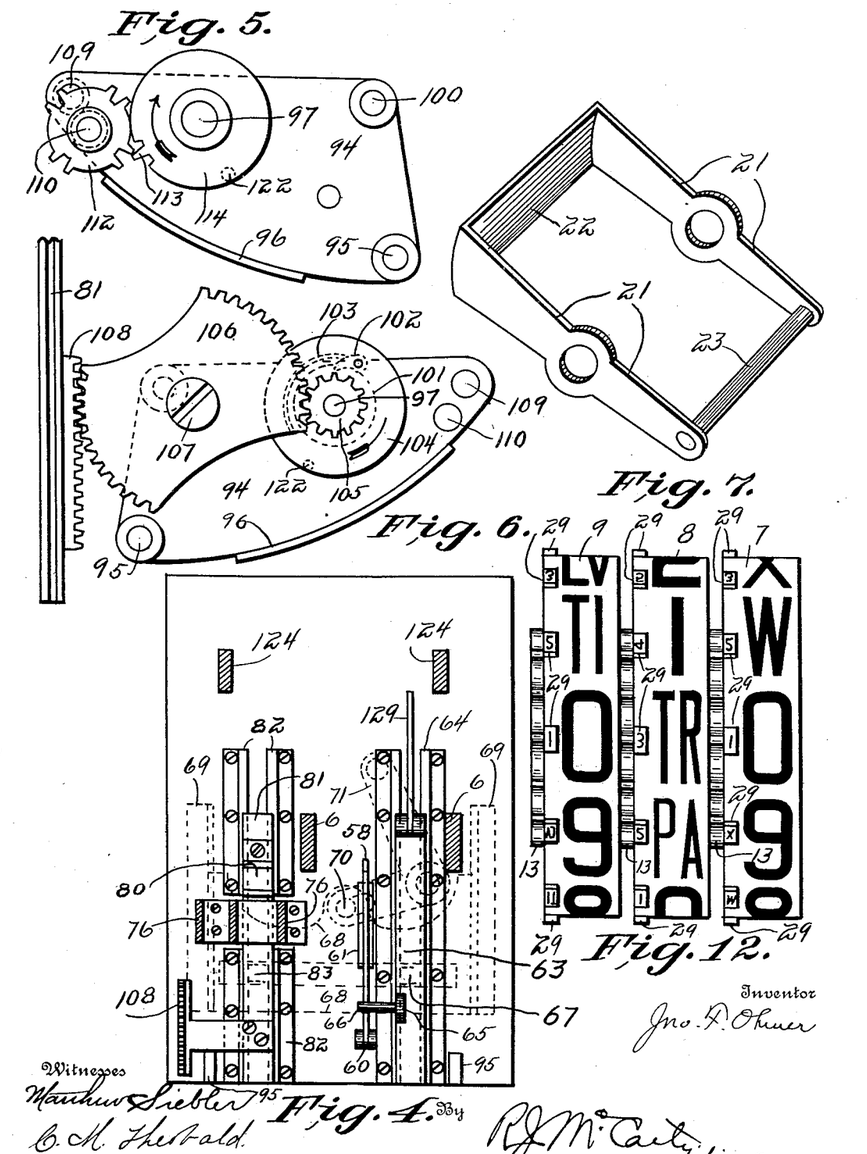
Fig. 4, is a view of the rear frame showing the actuating slides in position.
Fig. 5, is an elevation of the right hand side of the printing mechanism.
Fig. 6, is a similar view of the left hand side of the printing mechanism.
Fig. 7, is a perspective view of the reciprocating frame of the blind which operates in connection with the combined indicator and printing wheels.
Fig. 12, is a view of a modification of the combined fare-indicating and printing wheels.
Figure 8:
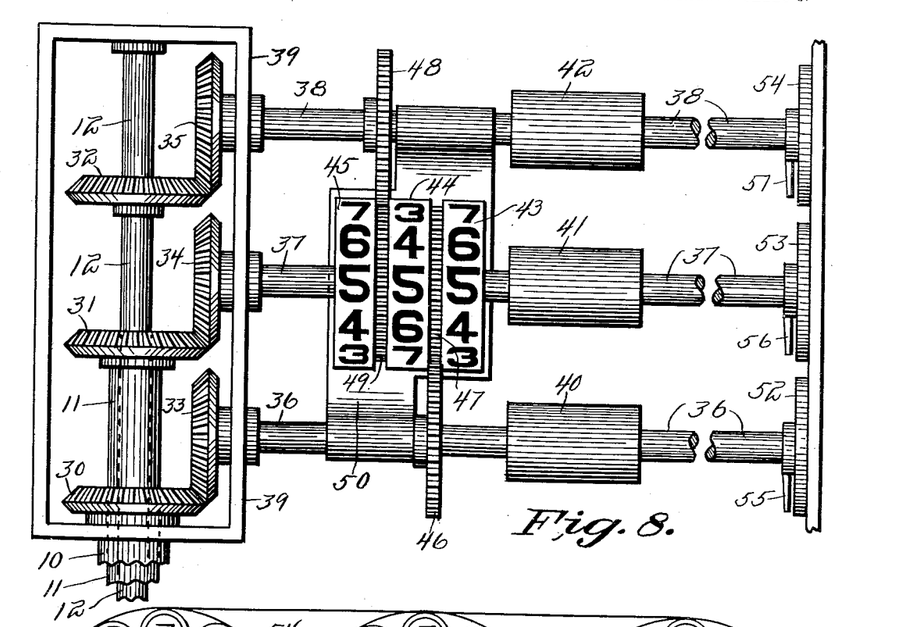
Fig. 8, is a plan view of the setting mechanism.
Figure 9:
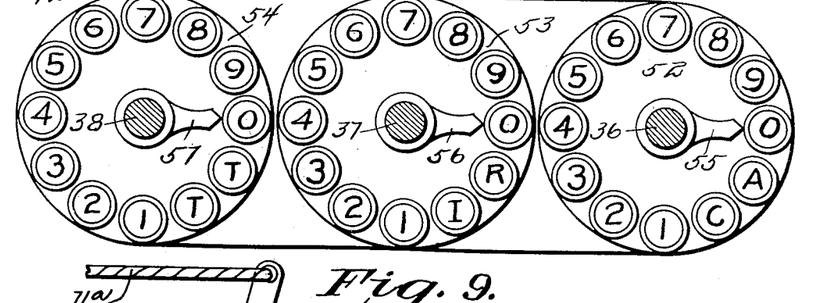
Fig. 9, is a view of the indicating dials on the setting rods.

The modification shown in Fig. 12, contemplates means upon each individual wheel to indicate tickets, transfers, passes, and any other data that it may be desired to indicate concurrently with the indications of the fares on said wheels. It will be noted that in this modification, the indications other than the numerals are readable upon each wheel and not upon the collection wheels as they are in Fig. 2. Also arranged upon the peripheries of these wheels at points adjacent to the indications thereon are raised type corresponding to the indications on the wheels. The arrangement of the type relatively to the indicating characters on the wheels is such that when any specific numeral or figure is in a position to be seen through the sight opening 2$^b$, the corresponding type of that indication is in the lower or printing position as shown in Fig. 3. So far as I am aware, it is new to thus employ a series of wheels having a capacity to indicate a fare through a sight opening and to print the same fare indicated. These printing type are designated by 29 and are so arranged that when in their lowermost position, each type lies immediately above a platen 99$^a$ which is supported upon side plates 94 at 100.

The printing mechanism will be referred to again. The combined indicator and printing wheels 7—8 and 9 as before stated, are connected to telescopic shafts 10—11 and 12 which extend upon the outside of the machine as shown in Fig. 1, and connect with the setting shafts 36—37 and 38 which extend on the interior of the car. These connections between the setting shafts and the telescopic shafts of the wheels are supported by the frame-work 39, which also supports the telescopic shafts on the outside of the register casing. The outer telescopic shaft 10 has a bevel gear 30 which is in mesh with a similar gear 33 on the setting shaft 36; this shaft being the "unit" shaft of the series. The intermediate telescopic shaft 11 has upon its end a similar bevel gear 31 engaging a bevel gear 34 on the tens setting shaft 37, and likewise the innermost telescopic shaft 12 has a bevel gear wheel 32 engaging a similar gear 35 on the hundreds setting shaft 38. All of these shafts have hand pieces 40—41 and 42 at suitable points which are gripped by the operator in turning the shafts of any selected indicating wheel.

Arranged at suitable intermediate points along the setting rods 36—37 and 38, are any desirable number of series of fare-selecting indicators which enable the operator to select the desired fare while observing the selecting indicators; these selecting indicators are 43—44 and 45, to-wit: units, tens and hundreds, all of said indicating wheels being on the intermediate or "tens" shaft. These indicator wheels are provided with sight openings 51 in a guard 50, the guard 50 being loosely supported upon the setting shafts 36 and 38. The unit indicator 43 is geared to the unit setting shaft 36 by spur wheels 46 and 47. The tens indicating wheel 44 is fast upon the setting shaft 37 while the hundreds indicating wheel 45 is loose upon the shaft 37 and is operated from the setting shaft 38 through spur wheels 48 and 49. At one end of the car, to-wit—the end opposite that at which the machine is located, the setting shafts are provided with selecting dials 52—53 and 54, through the axes of which the setting rods pass. These dials 52—53 and 54 as well as the indicating wheels 43—44 and 45 through which the fares are selected, have indications corresponding to the indications and the printing characters on the wheels in the register, to-wit—wheels 7—8 and 9. The setting rods have the usual pointers 55—56 and 57 which operate in connection with the indications shown on the selecting dials 52—53 and 54. Each of the combined indicating and printing wheels 7—8 and 9 has upon a face thereof a serrated wheel 13 which is fixed in its position. Adapted to ride in and out of the serrations in these wheels 13 is a series of rollers 14 carried upon arms 15 which are rigidly attached to a shaft 16, the latter shaft being journaled in brackets 17 which are extensions of the brackets 6, as clearly shown in Fig. 3.

Rigidly attached to one end of the shaft 16 is an arm 18 which has a slot 19 to receive a pin 20 which projects from the side plate 21 of the blind 22. The frame of the blind 22 mid-way of its length has suitable openings which receive the telescopic shafts 10—11 and 12 upon which it has its fulcrum. Connecting the rear end of the frame of the blind 22 is a rod 23 which operates in connection with parts presently described. In the operation of setting a selected wheel 7—8 or 9 to a position to indicate or print, the serrated wheel 13 attached to said wheel will cause the roller 14 coöperating with such serrated wheel to ride out of the serrations in said wheel 13; the effect of this is to cause the shaft 16 to rock, the arms 15 acting as a crank to rock said shaft and therewith the slotted arm 18 to elevate the rearward end of the frame 21 of the blind and to lower the blind 22 in front of the fare to be indicated and in the rear of the sight opening 2$^b$. The position of these parts when so elevated, is shown in Fig. 3 in dotted lines, and in which position, the rod 23 extending between the rear ends of the frame 21 of the blind 22 is in engagement with the upper end of the pawl 58, said upper end being indicated by 62 and consisting of a shoulder especially adapted to engage the rod 23 when in such position.

The pawl or detent 58 is pivoted in the lower portion of the casing at 60 and stands upright, being normally pressed forward by a spring 61 secured to the back of the casing. The front side of the pawl 58 has an upward and outward inclination 59 with which a pin 66 is in constant engagement. This pin extends from a projection 65 on the lower portion of the vertical operating member 63. This vertical operating member 63 moves in guides 64 on the back of the casing, and is elevated by means presently described. The pin 66 moving upwardly against the inclined side of the pawl 58, moves said pawl rearwardly a sufficient distance to release the rod 23 of the blind 22 from engagement with the shoulder 62 on the upper end of said pawl 58. It will be understood that, when the rod 23 of the blind is thus supported on the upper end of the pawl 58, the blind 22 closes the sight opening 2$^b$.

When the operation of the member 63 takes place, the blind 22 is made to clear the sight opening to reveal the indications on the indicator wheels which were previously moved to position. In this operative movement of the member 63 simultaneous movement is imparted to a set of consecutive printing counters 72 which may otherwise be termed passenger or fare printing counters. A distinction may be kept in mind between these counters and the combined indicator and printing wheels 7—8 and 9 by contemplating the latter wheels in the sense of printing the values of the fares, while the printing counters 72 print consecutively the fares. The printing counters 72 are of a well-known transfer type and are loosely mounted upon a shaft 74 which is supported in brackets 76 extending rearwardly from the back of the casing. In mesh with the gear wheels of said counters 72 are the transfer or driving gears 73 loose upon shaft 75 mounted in an extended portion of the brackets 76— see Figs. 2 and 14. The initial driving gear 73 is engaged by the driving pawl 78 which is pivoted to a pawl-supporting arm 79 which loosely incloses the shaft 75 adjacent to the gear 73.

Figure 13:
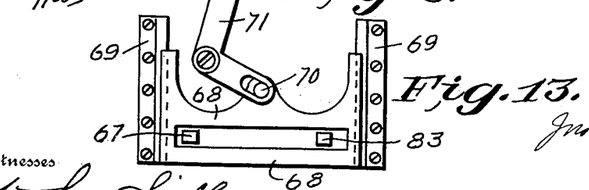
Fig. 13, is a view of the main actuating mechanism and the operating rope or member.

The pawl support 79 projects into the recessed end of an actuating arm 80 which is rigidly secured to one side of the actuating slide or member 81, the latter being movable in guides 82 on the rear side or back of the casing. This actuating member 81 in addition to operating the consecutive printing counters 72, also operates the printing devices shown in Figs. 5 and 6 to be presently described, and in this connection, it may be stated that the operating member 63 referred to in connection with the means for releasing the indicator blind 22 and said operating member 81, are operated simultaneously from the main actuator or frame 68 shown in Figs. 4 and 13. This actuating frame 68 moves vertically from guides 69 on the back of the casing and has a transverse slot into which projects a lug 67 on the operating member 63, and a lug 83 on the operating member 81.

Pivoted at 70 with the main operating member 68 is the lower arm of a bell crank lever 71, the upper arm of which connected with a rope or other flexible connection 71$^a$ which extends to points on the interior of the car and through which the main operating member 68 is operated to simultaneously release the blind 22, actuate the passenger indicator 125 to be presently described, actuate the consecutive printing counters 72, and the printing roll 117 and the printing mechanism.

The printing mechanism will now be described. It may be stated that it is essential that the consecutive printing counters 72 be free from any movement when the printing operation takes place. To insure this, the pawl of the printing mechanism as shown in Fig. 14, is provided with an upper arm 84 which moves in the path of a pin 85 supported in a stationary arm 86 projected from the shaft 75. When the pawl-supporting arm 79 carries the pawl to the extent necessary to move the printing counters 72 to the position to print, the arm 84 of said pawl engaging the pin 85 frees said pawl from engagement with the ratchet wheel 77 of the transfer wheels and thus the printing counters 72 are enabled to stop, before the printing operation takes place.

Figure 2:
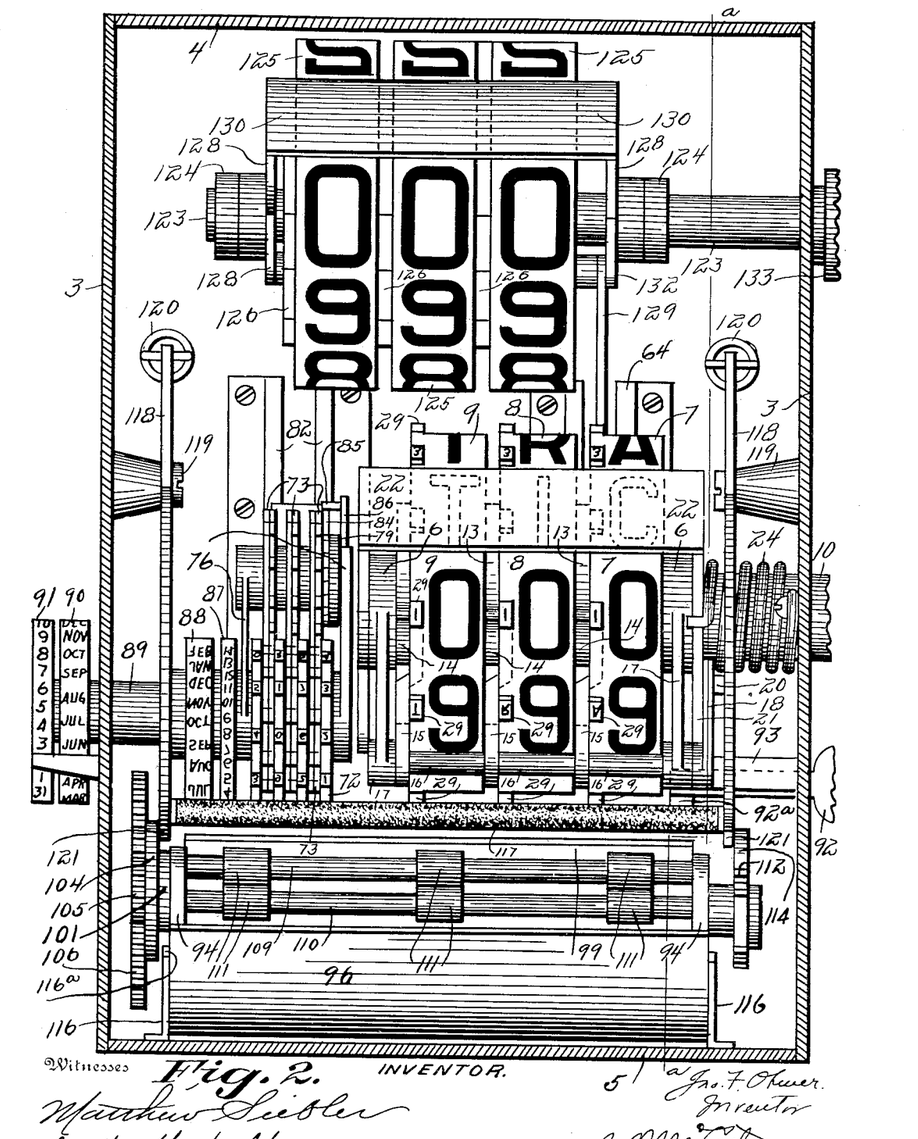
Fig. 2, is a front elevation of the machine with the front casing removed.

The printing surfaces of the counters 72 and the type 29, are in alinement as it will be observed from Fig. 2 from the drawings. The inking roller 117 is caused to move over the faces of the type on these devices at the proper time as presently shown. The said inking roller 117 is supported at each end on arms 118 which are pivoted at 119 and are connected with coil springs 120 which normally maintain the inking roller in a position to be engaged by trip devices and to be moved thereby over the faces of the printing type. These trip devices consist of two pins 122 projecting laterally from two disks 104 and 114 located respectively, on the opposite ends of shaft 97 which shaft is journaled in the side plates 94 of the printing mechanism. The shaft 97 is driven through means of a pinion 105 on one end thereof which is engaged by one side of a gear 106 pivoted at 107 to one of the side plates 94. These plates are joined by a horizontal guard 96. The gear 106 is in mesh with a rack 108 which is fixed to the rear side of the operating member 81 which has been before referred to in connection with Fig. 14. It will be thus seen that when the operating member 81 is elevated, the consecutive printing counters 72 and the inking device are operated. The pins 122, in the rotations of the disks, 104 and 114, will in time engage projections 121 on the ends of the arms 118 supporting the inking roller 117, and as the disks are continued in their rotations, the inking roller is drawn by the pins across the surfaces of the printing counters 72 and the type 29. The arms 118 are thus moved by the pins 122 engaging the projections 121 against the tension of the springs 120 hereinbefore referred to and the said springs return the arms and the inking roller to their normal position as shown in Fig. 3, when the pins are moved far enough to release the projections 121. The shaft 97 carries a suitable number of cams 98 which engage a transverse bar supporting a platen 99ª, said bar being supported on arms 99 which are pivoted at 100 to the side plates 94.

From Fig. 3, it will be seen that the pins 122 engage the inking devices in advance of the cams 98, the cam or cams 98 in turn elevating the platen 99ª to press the web of paper 115 which leads from a continuous roll, the shaft of which is mounted in the side plates 94. This web of paper leading from said roll passes over the upper side of the platen 99ª and through two unwinding rolls 109 and 110 journaled in the side plates 94 and having enlarged peripheral portions 111 which grip the web of paper and unwind the same during each operation of the shaft 97. These unwinding rolls 109 and 110 are moved concurrently with and from the shaft 97. On the end of the shaft 97 opposite that end which has the driving pinion 105, the disk 114 is provided with a single tooth 113 which engages a mutilated gear 112 on the end of one of the unwinding rollers and thus an intermittent movement is imparted to one of said rollers to-wit— roller 110, the other roller to-wit—109, being driven therefrom by the friction due to the enlarged portion 111. The side plates 94 of the printing mechanism are pivoted at 95 to a stationary part in the base of the casing and are supported by means of pins 116ª on the outer sides thereof which engage uprights 116 extending from the floor of the casing. In alinement with the consecutive printing counters 72 there are months and dates printing wheels 87 and 88, the former of which printing numbers corresponding to the days of the month and is connected with a date-setting wheel 91 located on the outer side of the casing. The months printing wheel 88 is likewise connected with a setting wheel 90 having corresponding inscriptions thereon and which is also located on the outer side of the casing; these months and dates printing wheels are thus manipulated from the outer side of the casing to set them to the desired printing positions.

The printed record as shown in Fig. 11, illustrates a statement that may be taken from the machine. Reading this statement from left to right, a and b are the columns of impressions taken from the wheels 88 and 87; the four columns indicated by c are the impressions taken from the consecutive printing counters; the three columns d e and f are the impressions taken from the type characters on the indicator wheels 7—8 and 9, and as these impressions clearly indicate the characters in the three columns are readable in combination, for example, 125 being the first three figures in the columns signifies $1.25 fare collection, while the next row of indications or impressions to wit—Tic stands for a ticket collection. The last column of impressions, to-wit—g designates the conductor's identification and are taken from a type 92ª on the end of the identification key 92 which is insertible in an apertured support 93 in the casing as clearly shown in Fig. 2. The passenger or trip indicator wheels 125 are mounted in the upper portion of the casing upon shaft 123 which extends out of the casing and is provided with a hand piece 133 by which it is manipulated to set the wheels to zero. The shaft 123 is supported in brackets 124 extending from the back of the casing. These wheels are of a well known construction, and each one is provided with a ratchet wheel 126 fixed to its outer side. Adapted to engage with these ratchet wheels 126 is a tripled tooth pawl 127, the teeth of which are arranged out of alinement in a well-known manner to properly engage corresponding teeth in the ratchet wheels 126. These pawls are pivoted upon a suitable shaft 132 which is connected to the operating member 63 through means of a link 129 the lower end of said link being pivoted to said operating member at 131. Also connected with each end of the rod 132 are the arms 128 which support the blind or flash 130 which is movable over the front of the trip or passenger wheels in a well-known manner to conceal the indication on said wheels until each operation of the machine is completed. After the completion of each operation, the indication or indications on said wheels are visible through the upper sight opening 2ª in the front of the machine.

Briefly describing the operation of the machine, it may be stated that the combined indicating and printing wheels 7—8 and 9 are set by turning their respective shafts which extend on the exterior side of the machine. This operation concurrently lowers the blind or flash 22 to conceal the indication. It will be remembered that the blind is maintained in this position by the rod 23 being elevated to engagement with the shoulder 62 on the upper end of the upright pawl 58. During the turning of one or the other of said wheels, the rollers on the ends of the arms 15 jump in and out of the recesses in the wheels 13 and thus impart movement to the slotted arm 18 to elevate the frame or side plates 21 of the blind or flash 22. At the termination of each setting operation of the wheels 7—8 and 9, a retaining roll 25, of which there is one mounted upon each of three arms 26 pivoted at 27, jumps into recesses in the wheels 13 and serves to hold the wheels in their set positions. The rearward ends of the arms 26 have springs 28 connected to them which exert a pressure serving to maintain the retaining rolls 25 in engagement with the wheels 13. The machine is then set and is ready for operation. This operation takes place by actuating the bell crank lever 71 through the rope or pull connection. The main operating member 68 in this operation lifts the operating members 63 and 81, the former member acting upon the upright pawl 58 to release the blind 22 and permit it to expose the indications on the wheels 7—8 and 9. The blind as soon as released is thrown up by the tension of the coil spring 24 to expose the fare. Simultaneously therewith, the trip or the passenger indicators 125 are operated owing to their connection with the operating member 63; the consecutive printing counters 72 are simultaneously operated from the operating member 81, and the printing wheels and devices are immediately inked and the inking roller permitted to move away after which the impression resulting in the statement shown in Fig. 11 is taken, all of which operations occurring on the complete and simultaneous upper movements of the two operating members 63 and 81.

It is necessary that the shaft 97 of the printing mechanism shall only have movement in one direction, for example, when the operating member 81 is ascending—see Fig. 6 on Sheet 4. The pinion 105 and the disk 104 move in unison with each other and are loose upon the shaft 97. Fixed to the shaft 97 on the inside of the disk 104 is a ratchet wheel 101 as seen in Figs. 2 and 6. Engaging this ratchet wheel is a pawl 102 pivoted to the inner side of the disk 104 and normally maintained in engagement with the ratchet wheel by a spring 103 which presses against the upper side of the pawl.

It will be seen that the shaft 97 is moved in the direction indicated by the arrow in Fig. 6 when the operating member 81 ascends, but when the operating member 81 descends, the shaft 97 remains stationary owing to the ratchet pawl being carried away from the ratchet wheel 101.

Havng described my invention, I claim:

1. In a registering machine, the combination with an indicating wheel, a serrated wheel attached thereto and movable in unison therewith, a roller adapted to move in and out of the serrations in said serrated wheel in the setting movement of the indicating wheel, and means actuated from said roller to conceal the indication on said indicator wheel when set, means for holding said concealing means in position to conceal said indicating wheel, and means to release said concealing mechanism when the machine is operated and whereby the indication on the indicating wheel is exposed.

2. In a registering machine, a series of indicating wheels bearing indications denoting specific transactions, a series of serrated wheels, one attached to each indicating wheel, a series of rollers actuated from said serrated wheels, a blind, connections between said blind and said rollers whereby the blind is actuated to conceal the indication on said indicating wheels when said indicating wheels are set, and means for setting said indicator wheels.

3. In a registering machine, a series of wheels having indications denoting specific transactions, a series of serrated wheels, one attached to each indicating wheel, a series of rollers one for each serrated wheel, a blind, connections between said rollers and said blind and whereby said blind is actuated by the setting movement of any of the indicating wheels, said blind being movable to a position to conceal an indication on the indicating wheels when the latter are set, and a pawl to hold said blind in position to conceal an indication until the machine is operated.

4. In a registering machine, the combination with a series of indicator wheels, of a blind mounted on arms with rearward extensions, a shaft connecting said rearward extensions, a pawl adapted to engage said shaft to hold the blind in a concealing position until the machine is operated, and means for simultaneously setting the indicator wheels and moving the blind to a concealing position before the operation of the machine.

5. In a registering machine, means bearing indicating characters and printing characters, means for setting said indicating means to indicating and printing positions means actuated by said setting means to conceal the indication on the indicating means, means for registering specific transactions in the machine, and means actuated concurrently with the operation of registering specific transactions in the machine, and whereby the indication on the indicating means is visually exposed after the transaction has been registered in the machine, and means for taking impressions from said printing characters.

6. In a registering machine, the combination with an indicator wheel, and a serrated wheel movable in unison therewith, of a blind adapted to move over the face of the indicator wheel, means interposed between the serrated wheel and the blind whereby said blind is moved to a concealing position when the indicator wheel is set, and means for releasing the blind from its concealing position.

7. In a registering machine, the combination with a passenger indicator, and a fare indicator, of means for concealing the fare indicator simultaneously with its movement to a set position, means for holding said concealing means in position to conceal the fare indicated on said fare indicator, and an operating member common to the passenger indicator and the concealing means of the fare indicator, and by means of which movement is imparted simultaneously to the pasenger indicator to indicate the number of passengers, and to the concealing means of the fare indicator to release said means and to thus expose the fare indications on said indicator.

8. In a registering machine, the combination with a passenger indicator, and a fare indicator having visible and printing indicating characters thereon, of means for concealing the indications on said fare indicator when the latter is set to a position to indicate, printing mechanism adapted to take statements or prints from the printing characters on the fare indicator, and an actuator common to the passenger indicator, the concealing means of the fare indicator, and the printing mechanism.

In testimony whereof I affix my signature, in presence of two witnesses.

JOHN F. OHMER.

Witnesses:
R. J. McCARTY,
C. M. THEOBALD.